United States Patent Office 3,323,292
Patented June 6, 1967

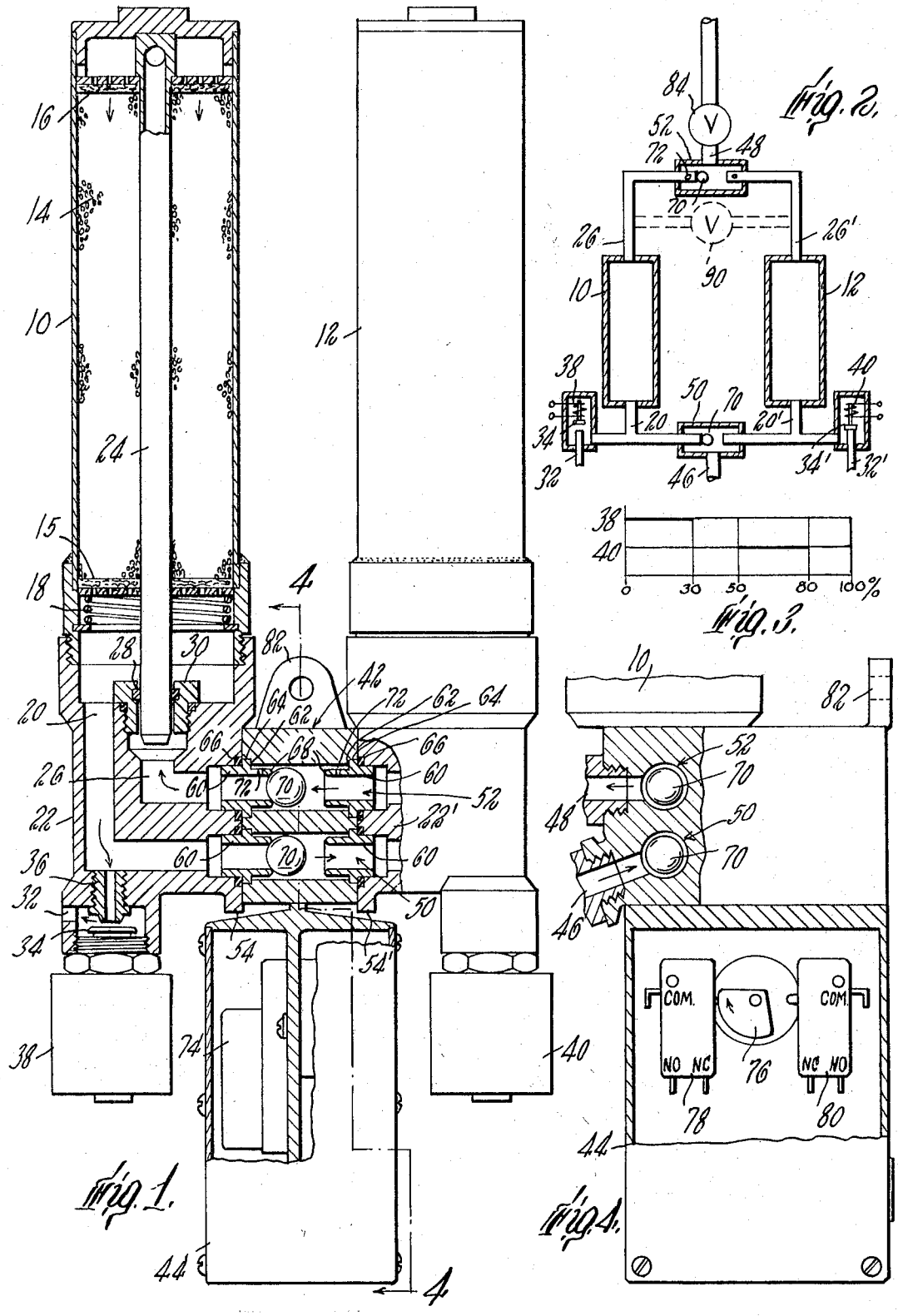

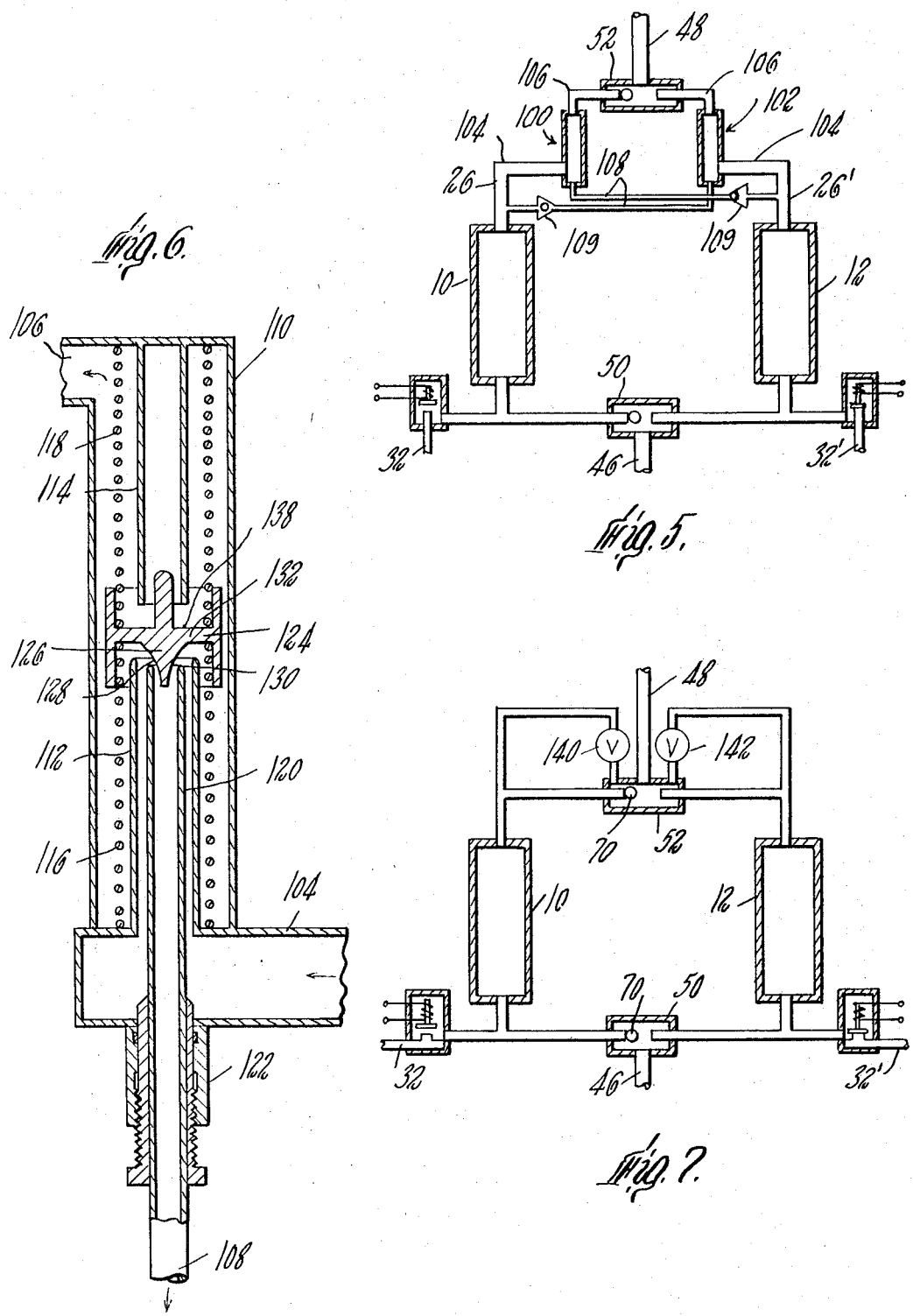

3,323,292
APPARATUS FOR FRACTIONATING
GASEOUS MIXTURES
Charles D. Brown, Raymond, Maine, assignor to Dielectric Products Engineering Company, Inc., Raymond, Maine, a corporation of Michigan
Filed Dec. 1, 1964, Ser. No. 414,979
10 Claims. (Cl. 55—162)

This invention relates to apparatus for fractionating gaseous mixtures and more particularly to fractionating apparatus in which the gas removing material employed in the fractionating process may be cyclically regenerated without the use of heat.

It is frequently desired to remove one or more components from a gaseous mixture in connection with an industrial process. For example, it may be desired to purify a gaseous stream, removing all except a significant component, or it may be desired to remove moisture from an air stream. Electrical signal transmission systems of the wave guide type often employ pressurized air to increase and maintain the requisite dielectric integrity of the transmission system, and it is essential that substantially all water vapor be removed from the air before it is used in such a system.

Many types of apparatus for fractionating gaseous mixtures have been proposed and used in which relatively absorbent, adsorbent or similar material is employed to remove one or more components from the gaseous mixture. The efficacy of such material is reduced as it becomes laden with the component or components that are being removed from the mixture, and therefore, conventionally it is regenerated periodically. While heat is frequently used to regenerate a moisture laden disiccant, for example, heatless apparatus have been proposed for regenerating such moisture laden disiccants. Typically, in such apparatus a fraction of the moisture-free gas produced by flow through a desiccant chamber is flowed in the reverse direction through the desiccant chamber to desorb the moisture from the desiccant material. Such apparatus, however, which have been proposed in the past have utilized a multiplicity of control valves and complex piping arrangements that have increased their cost and decreased their reliability so that there has been a significant reluctance to adopt the use of such systems on a substantial basis.

Accordingly, it is an object of this invention to provide novel and improved apparatus suitable for operation in applications where purification or fractionation of a gaseous mixture is desired.

Another object of the invention is to provide a gaseous fractionating system of the type which is simpler in construction than such systems heretofore proposed and which does not require extraneous heat to restore the material used in the system to an efficacious condition.

Still another object of the invention is to provide a simple and compact apparatus which enables a component to be removed from a gaseous stream.

A further object of the invention is to provide a novel and improved gaseous fractionating apparatus which is smaller and less expensive to manufacture and more reliable in operation than gaseous fractionating apparatus heretofore proposed.

Another object of the invention is to provide novel and improved control apparatus for controlling the regeneration of gas removing materials.

Still another object of the invention is to provide novel and improved gaseous fractionating apparatus of the type in which a fraction of the purified gaseous stream with a component removed therefrom is fed back through a second desiccant chamber to desorb from the desiccant material incorporating means to vary the rate of flow of the fraction fed back as a function of system input condition.

In accordance with the invention there is provided fractionating apparatus for removing at least one component from a gaseous mixture that includes two chambers connected in parallel between an inlet conduit and an outlet conduit. Each chamber has an inlet end and an outlet end and is adapted to contain material for removing a component from the gaseous mixture. This gas removal operation may utilize adsorption or absorption phenomena or related phenomena not necessarily of either type. In this patent the term "absorbent" is intended to include all such phenomena for removing one or more components from a gaseous mixture. The outlet ends of the two chambers are connected together by a "reflux" path for passing a fraction of the effluent mixture from one chamber back through the other chamber in a desorption operation. The inlet end of each chamber has connected to it a conduit arranged for connection to a system exhaust, in which conduit a control valve is disposed. Operator means for the control valves opens the two valves alternately to connect the coupled chamber inlets to the system exhaust. The sequence of valve control preferably includes an interval before each valve opening during which both valves are closed to provide for repressurizing of the chamber subjected to reverse flow during the previous portion of the operating cycle. The system inlet conduit is connected to both chamber inlet ends through a first flow directing valve, and the chamber outlet ends are connected to the system outlet conduit through a similar flow directing valve. Both flow directing valves operating in response to the operation of the control valves to selectively provide a main path of gas transfer from the inlet conduit through the two chambers in the forward direction to the outlet conduit. Each control valve operation switches this path to the other chamber.

This invention provides a compact gas fractionating unit in which the gas component removing material is cyclically regenerated through coordinated control of only two valves which are of basic on-off design. In the particular embodiments disclosed hereinafter in detail, all the moving valve components are manufactured of resilient material and as such do not require lubrication so that contaminants are not introduced into the gaseous stream from that source.

A balancing valve may be connected between the chamber outlet ends, which valve is opened during each interval both control valves are closed to reduce the time required for repressurizing a chamber. Also, the apparatus may include an arrangement for varying the amount of gas utilized in the desorption operation, as a function of the input gas flow or the degree of saturation of the input gas with the component to be removed.

Other features, objects and advantages of the invention will be seen as the following description of particular embodiments of the invention progresses, in conjunction with the drawings, in which:

FIG. 1 is a front elevational view, partially in section, of gas fractionating apparatus constructed in accordance with the invention;

FIG. 2 is a diagrammatic view of the fractionating apparatus shown in FIG. 1;

FIG. 3 is a timing diagram indicating the operational sequence of the apparatus;

FIG. 4 is a sectional view taken along the line 4—4 of FIG. 1;

FIG. 5 is a diagrammatic view of a modified form of gas fractionating apparatus incorporating apparatus for varying the purge flow rate;

FIG. 6 is a sectional view of apparatus employed in the system shown in FIG. 5; and FIG. 7 is a diagrammatic view of still another form of gas fractionating apparatus.

The gas fractionating apparatus shown in FIG. 1 includes a pair of absorption vessels in the form of desiccant chambers 10, 12. Each chamber includes a suitable absorbent material 14 which in general may be any material which has a selective affinity for one or more of the components in the gaseous mixture that is to be supplied to the apparatus. In the particular embodiment the absorbent material is silica gel, a desiccant material which is disposed uniformly and continuously throughout the chamber volume between filter elements 15, 16. A loading spring 18 is disposed below the desiccant bed. It will be understood that other absorbent materials may be utilized, and a plurality of different absorbent materials may be arranged in a series of layers in the chamber in particular types of gas fractionating applications.

The gas to be fractionated is applied at the base (input) of the chamber, through the passage 20 in base housing 22, and flows upwardly past the spring 18 and through the absorbent material to the upper (outlet) end of the chamber. Tube 24, located concentrically within each vessel 10, 12, provides a passage through the chamber, and the fractionated gas flows down to the outlet passage 26 in the base housing 22. Central tube 24 is sealed from the inlet passage 20 by means of seals 28 in bushing 30.

In addition to the chamber inlet and outlet passages 20, 26, the base housing 22 has an exhaust passage or port 32 which is controlled by valve member comprising resilient disc 34 which is arranged to seat on the entire circumferential area of bushing 36 to seal the exhaust port 32 from the inlet passage 20. Solenoid valve operators 38, 40 are secured to the respective base housings 22, 22' for controlling the valves 34, 34'.

Secured between the two base housings 22, 22', is a common coupling unit 42 which supports a control unit 44, defines the system inlet 46 and system outlet 48, and houses two flow directing valve units 50, 52. Flanges 54, 54' of the base housings 22, 22' are secured to the central unit 42 by conventional fastening means.

Each flow directing valve includes two cylindrical sleeve members 60 that are disposed in opposed relation within respective bores in the central unit 42. Each bore has annular shoulders 62 against which a flange portion 64 of each sleeve member abuts. Against the outer surface of each flange 64 is disposed a sealing element 66 in the form of an O-ring, for example, which is compressed into a tight seal by a projecting surface of the base housing 22. The inner end of each sleeve has formed thereon a smooth valve seat surface 68. Disposed between the two opposed valve seats 68 within each bore is a neoprene ball 70 which is free to move between the seats 68 and controls the flow of gas through the flow directing unit to and from the chambers 10 and 12.

The output flow directing valve 52 further includes an orifice 72 (FIG. 2) in the inwardly projecting portion of each of its two sleeves 60, 60 which provide an unvalved passage for the reflux fraction of the fractionated gas.

Control unit 44 includes a timer motor 74 which rotates cam 76 to operate two switches 78, 80 and these control solenoids 38, 40, respectively. Brackets 82 are also provided on the central unit 42 for mounting the fractionating apparatus.

A diagram of this apparatus is shown in FIG. 2. As there indicated, a control valve 84 may be connected into the outlet line downstream from the outlet 48 to control the rate of flow of the fractionated gas to the utilization apparatus. In the positions of the apparatus shown in FIGS. 1 and 2, input gas is flowing upwardly through chamber 12 and a fraction of the gas from the outlet end of chamber 12 is passed by orifice 72 in the lefthand sleeve 60 for flow downwardly through chamber 10 and out through port 32 as solenoid 38 is energized.

An illustrative sequence of operation of the solenoids 38 and 40 is indicated in FIG. 3. As there indicated, only one exhaust valve 34 is open at any time and between each valve opening both valves are closed. In operation, initially the gas flow is as indicated in FIG. 2. When solenoid 38 is deenergized, both control valves 34 are closed, so that both desiccant chambers may be brought up to equal pressure. (To reduce the interval required for repressurizing a desiccant chamber, a balancing valve 90 may be connected directly between the output ends of the desiccant chambers (by-passing flow control valve 52) and control provided to open valve 90 when both control valves 34 are closed.) When both chambers are at substantially the same pressure, solenoid 40 is energized to open exhaust port 32' to system exhaust (atmosphere in this case). This causes the two resilient balls 70 in flow directing valves 50 to move to the right as indicated in FIG. 2. In the inlet valve 50, this opens the inlet conduit 22 to chamber 10 and closes the inlet conduit 22' to chamber 12. The input gas then flows upwardly through chamber 10 and into the outlet valve 52 in which its neoprene ball has been also moved against the righthand port seat. A fraction of the output gas will flow past the ball via orifice 72 into the outlet line 26' for flow downwardly through the desiccant chamber 12 in a desorption operation and out exhaust passage 32'.

Thus, moisture laden air is alternately applied to desiccant chambers 10 and 12. The silica gel 14 in each chamber absorbs the moisture in the input air so that the air at the output end that passes into passageway 26 is substantially moisture free. A fraction of this air is passed back through the other chamber to desorb the moisture and regenerate the desiccant in that chamber. The control unit 44 (which, while indicated as including an electrical timer, may be another type of sequencing device, e.g. pneumatically or mechanically operated) cyclically operates the two control valves 34 and the flow directing valves 50, 52 respond to that operation. This sequencing operation produces the moisture-free air or other fractionated gas as desired, while concurrently regenerating the absorbent material.

It will be seen that this fractionating apparatus is extremely simple and compact in construction, utilizing only two sequencer controlled valves. Those controlled valves are of the reliable, soft-seat type which are only moved between fully open and fully closed positions. Two flow directing valves operate in response to the operation of the control valves. In each of those flow directing valves, the only moving component is a resilient ball. The two flow directing valves may be mounted within a common housing on which the two absorption chambers 10 and 12 are secured. A sturdy and reliable, yet economical, gas fractionating unit thus results.

As indicated above, the desirable rate of flow of purge gas in reverse direction through an absorption chamber may vary as a function of the input rate of flow. Where it is desired to vary the rate of flow of purge gas for economic reasons, for example, the apparatus may be modified to incorporate the arrangement shown in FIGS. 5 and 6. In that system there is connected between the output conduits 26, 26' and the output flow directing valve 52 two variable orifice purge flow rate control units 100, 102. Each unit has a main input line 104, a main output line 106, and a purge output line 108. A check valve 109 is connected in each purge output line 108. The output valve is modified to the extent that no orifices 72 are provided in its sleeves 60 so that the input and output flow directing valves are identical.

Details of the purge flow rate control units may be seen with reference to FIG. 6. Each control unit includes a cylindrical structure 110 in which two opposed axially extending cylindrical guides 112, 114 are mounted. Guide 112 defines a passageway from inlet line 104 and serves to align balancing spring 116, while guide 114 merely serves as a guide for the second balancing spring 118.

Disposed concentrically within guide 112 is a conduit 120 which extends through coupling unit 122 for connection to the purge line 108. Disposed between and supported by the balancing springs 116, 118 is valve member 124 which those springs hold in spaced relation from the ends of guides 112 and 114. Valve member 124 has a conical projection 126 which defines curved surface 128 that co-operates with the end 130 of conduit 120 to define an annular orifice and a radially extending flange surface 132. The proportions of projection 126 are such that the area of the annular orifice varies as the square root of the axial displacement of valve member 124.

The inlet gas flow impinges on the flange surface 132 of valve member 124 and tends to displace the valve away from surface 130. As the force characteristics of the two springs 116 and 118 are linear, the movement of valve member is proportional to the impinging force ($\rho V^2$), and thus the area of the annular orifice between surfaces 128 and 130 varies in a direct proportionality to the rate of flow in the main line 104. As that flow increases, the amount of gas returned to the purge line 108 increases. Should it be desired to reverse this relationship to make the variation in orifice area inversely proportional to the flow in the main line (for example, where the input air is saturated with water vapor), the control unit is reversed so that conduit 105 is connected to the input line and conduit 104 is connected to the output line. The input force then acts on flange surface 138, and as that force increases, the area of the annular orifice decreases.

Another modification is indicated in FIG. 7 in which adjustable needle valves 140, 142 are substituted for orifices 72. These needle valves may be manually or automatically adjusted to vary the quantity of reflux gas fed back for the desorption operation.

While particular embodiments of applicant's invention have been shown and described, it is obvious that still further modifications thereof will be apparent to those of ordinary skill in the art. Therefore, while these embodiments have been shown and described in detail, it is not intended that the invention be limited to the disclosed embodiments or to details thereof and departures may be made therefrom within the spirit and scope of the invention as defined in the claims.

What is claimed is:
1. Apparatus for the absorptive fractionation of a gaseous mixture comprising an inlet conduit,
    an outlet conduit,
    two absorption chambers,
    each said chamber adapted to contain material for absorbing a component of said gaseous mixture and each said chamber having an inlet end and an outlet end,
    a conduit connected to the inlet end of each chamber arranged for communication with a system exhaust,
    control valve means in each said conduit,
    control valve operator means for alternately opening said control valves,
    first flow directing valve means connected between said inlet conduit and the inlet ends of said two chambers for selectively closing the path of gas transfer between said inlet conduit and said inlet ends in response to the fluid flow produced by the condition of said control valve means, and
    second flow directing valve means disposed in a housing connected between the outlet ends of said two chambers and said outlet conduit for selectively closing the path of gas transfer between said outlet ends and said outlet conduit in response to the fluid flow produced by the condition of said control valve means, the housing of said second flow directing valve means including a continuously open orifice providing a flow path by-passing said second flow directing valve means for transferring a fraction of the gaseous mixture passed through one chamber in the forward direction to the other chamber for flow through the other chamber in the reverse direction to desorb a component of the gaseous mixture absorbed by material in said other chamber and each said flow directing valve means includes two opposed annular valve seat surfaces and a resilient member arranged to be seated on either of said seat surfaces to prevent flow of gas past said seat surfaces and movable between said valve seat surfaces.

2. Apparatus for absorptive fractionation of a gaseous mixture comprising two absorption chambers,
    each said chamber adapted to contain material for absorbing a component of said gaseous mixture,
    inlet means for applying said gaseous mixture to said chambers,
    valve means in said inlet means for controlling the flow of said gaseous mixture to said absorption chambers,
    feedback means connected to a transfer minor fraction of the gas stream passed through said one absorption chamber to the other absorption chamber for reverse flow therethrough to desorb a component of said gaseous mixture absorbed by material contained in said other chamber,
    said feedback means including a housing defining an inlet connected to the outlet of said one absorption chamber, a main outlet, a secondary outlet connected to the outlet of said other absorption chamber, and an orifice through which said minor fraction of said gas stream is passed,
    and a control member in said housing for varying the effective area of said orifice as a function of the force imparted by the velocity of said gas stream into said feedback means,
    and means to operate said valve means for channeling said gaseous mixture through said chambers alternately.

3. Apparatus for the absorptive fractionation of a gaseous mixture comprising two absorption chambers,
    each said chamber adapted to contain material for absorbing a component of said gaseous mixture and each said chamber having an inlet and an outlet disposed in proximity,
    a control structure defining a system inlet and a system outlet, said control structure being connected between the inlets and outlets of said two chambers for applying a gaseous mixture to said chambers,
    said structure further including means for applying a major fraction of the gas passed through one chamber in the forward direction to said system outlet and a minor fraction of that gas to said other chamber for flow through said other chamber in the reverse direction to desorb a component of said gaseous mixture absorbed by material in said other chamber,
    an exhaust conduit connected to the inlet end of each chamber arranged for communication with a system exhaust,
    a control valve in each said exhaust conduit,
    control valve operator means for alternately opening said control valves, said control valve operator means including a common control member for controlling the position of said control valves, said common control member being movable to a first position to open one control valve and close to the other control valve and to a second position to close said one control valve and open said other control valve, and means for cyclically moving said common control member between said first and second positions,
    first flow directing valve means disposed in said control structure and connecting between said system inlet and the inlets of said two chambers for selectively closing the path of gas transfer between said system inlet and said chamber inlets in response to the pressure drop consequent to opening of either of said control valves, and
    second flow directing valve means disposed in said control structure and connected between the chamber outlets and said system outlet for selectively closing the path of gas transfer between said chamber outlets and said system outlet in response to said pressure drop.

4. The apparatus as claimed in claim 3 wherein each said flow directing valve means includes two opposed annular valve seat surfaces and a resilient spherical member arranged to be seated on either of said seat surfaces to prevent flow of gas past the seat surface on which it is seated and freely movable between said valve seat surfaces.

5. The apparatus as claimed in claim 3 wherein said fraction transferring means includes a continuously open orifice in the housing of said second flow directing valve means for providing a flow path bypassing said second flow directing valve means.

6. The apparatus as claimed in claim 3 wherein said fraction transferring means includes a housing defining an inlet connected to the outlet of said one chamber, a main outlet connected to said system outlet, a secondary outlet connected to the outlet of said other chamber and means defining an orifice,
a control member disposed in said housing for cooperation with said orifice,
and means for supporting said control member for movement in response to changes in the velocity of said gaseous mixture so that
said control member and said orifice define a passage of area that varies in proportion to the velocity of said gaseous mixture.

7. The apparatus as claimed in claim 3 wherein each said control valve includes a substantial flat resilient valve member,
means defining an annular orifice,
and means responsive to said operator means for moving said valve member into engagement with said orifice defining means to close said orifice.

8. The apparatus as claimed in claim 2 wherein said control member includes a conically shaped portion disposed coaxially with respect to said orifice,
and two opposed springs having linear characteristics for supporting said control member for straight line movement towards and away from said orifice in response to changes in the flow rate of said gaseous mixture so that the flow passage area defined by said control member and said orifice varies in linear proportion to the velocity of said gaseous mixture from said chamber outlet.

9. The apparatus as claimed in claim 8 wherein each said flow directing valve means includes two opposed annular valve seat surfaces and a resilient spherical member arranged to be seated on either of said seat surfaces to prevent flow of gas past the seat surface on which it is seated and freely movable between said valve seat surfaces.

10. Apparatus for the absorptive fractionation of a gaseous mixture comprising an inlet conduit,
an outlet conduit,
two absorptive chambers,
each said chamber adapted to contain material for absorbing a component of said gaseous mixture and each said chamber having an inlet end and an outlet end,
a housing connected between the outlet ends of said two chambers for transferring a fraction of the gaseous mixture passed through one chamber in the forward direction to said other chamber for flow through the other chamber in the reverse direction to desorb a component of said gaseous mixture absorbed by material in said other chamber,
said housing defining an inlet connected to the outlet end of one of said chambers, a main outlet connected to said outlet conduit, and a secondary outlet connected to the outlet end of the other chamber, and a control member in said housing for varying the effective size of said secondary outlet as a function of velocity of gas flow through said inlet,
a conduit connected to the inlet end of each chamber arranged for communication with a system exhaust,
control valve means in each said conduit,
control valve operator means for alternately opening said control valves,
first flow directing valve means connected between said inlet conduit and the inlet ends of said two chambers for selectively closing the path of gas transfer between said inlet conduit and said inlet ends in response to the fluid flow produced by the condition of said control valve means, and
second flow directing valve means connected between the outlet ends of said two chambers and said outlet conduit for selectively closing the path of gas transfer between said outlet ends and said outlet conduit in response to the fluid flow produced by the condition of said control valve means.

References Cited
UNITED STATES PATENTS

| | | | |
|---|---|---|---|
| 1,887,606 | 11/1932 | Thomas | 55—162 |
| 2,979,828 | 4/1961 | Westeren | 55—62 X |
| 3,104,162 | 9/1963 | Skarstrom | 55—62 X |
| 3,186,150 | 6/1965 | Zankey | 55—62 X |
| 3,192,686 | 7/1965 | Berkley et al. | 55—62 X |

REUBEN FRIEDMAN, *Primary Examiner.*

J. ADEE, *Assistant Examiners.*